United States Patent
Shaath et al.

(10) Patent No.: US 7,536,524 B2
(45) Date of Patent: May 19, 2009

(54) METHOD AND SYSTEM FOR PROVIDING RESTRICTED ACCESS TO A STORAGE MEDIUM

(75) Inventors: Kamel Shaath, Kanata (CA); Jonathan Gossage, Nepean (CA); Tony Walker, Stittsville (CA); Yasser Lulu, Ottawa (CA); Fu Yaqun, Nepean (CA)

(73) Assignee: KOM Networks Inc., Ontario (CA)

( * ) Notice: Subject to any disclaimer, the term of this patent is extended or adjusted under 35 U.S.C. 154(b) by 23 days.

(21) Appl. No.: 11/482,115

(22) Filed: Jul. 7, 2006

(65) Prior Publication Data

US 2007/0094471 A1    Apr. 26, 2007

Related U.S. Application Data

(60) Continuation-in-part of application No. 10/600,540, filed on Jun. 23, 2003, now Pat. No. 7,076,624, which is a continuation of application No. 10/032,467, filed on Jan. 2, 2002, now Pat. No. 6,654,864, which is a division of application No. 09/267,787, filed on Mar. 15, 1999, now Pat. No. 6,336,175.

(30) Foreign Application Priority Data

Jul. 31, 1998   (CA) .................................. 2224626

(51) Int. Cl.
    *G06F 12/00* (2006.01)
(52) U.S. Cl. ..................................... 711/163
(58) Field of Classification Search .................. 711/163
    See application file for complete search history.

(56) References Cited

U.S. PATENT DOCUMENTS

| | | | |
|---|---|---|---|
| 4,399,504 A | 8/1983 | Obermarck et al. | |
| 4,757,533 A | 7/1988 | Allen et al. | |
| 4,890,223 A | 12/1989 | Cruess et al. | |
| 4,947,318 A | 8/1990 | Mineo et al. | |
| 4,958,314 A | 9/1990 | Imai et al. | |
| 4,975,898 A | 12/1990 | Yoshida et al. | |
| 5,163,147 A | 11/1992 | Orita et al. | |
| 5,214,627 A | 5/1993 | Nakashima et al. | |
| 5,434,562 A | 7/1995 | Reardon | |
| 5,495,533 A | 2/1996 | Linehan et al. | |
| 5,537,636 A | 7/1996 | Uchida et al. | |
| 5,572,675 A | 11/1996 | Bergler et al. | |
| 5,596,755 A | 1/1997 | Pletcher et al. | |
| 5,708,650 A | 1/1998 | Nakashima et al. | |
| 5,717,683 A | 2/1998 | Yoshimoto et al. | |
| 5,778,365 A | 7/1998 | Nishiyama et al. | |
| 5,825,728 A | 10/1998 | Yoshimoto et al. | |
| 5,850,566 A | 12/1998 | Solan et al. | |
| 5,949,601 A | 9/1999 | Braithwaite et al. | |

(Continued)

*Primary Examiner*—Hiep T Nguyen
(74) *Attorney, Agent, or Firm*—Venable LLP; Ralph P. Albrecht

(57) ABSTRACT

A method of restricting file access is disclosed wherein a set of file write access commands are determined from data stored within a storage medium. The set of file write access commands are for the entire storage medium. Any matching file write access command provided to the file system for that storage medium results in an error message. Other file write access commands are, however, passed onto a device driver for the storage medium and are implemented. In this way commands such as file delete and file overwrite can be disabled for an entire storage medium.

32 Claims, 7 Drawing Sheets

U.S. PATENT DOCUMENTS

| | | |
|---|---|---|
| 5,978,914 A | 11/1999 | Carley et al. |
| 6,044,373 A | 3/2000 | Gladney et al. |
| 6,141,754 A | 10/2000 | Choy |
| 6,286,087 B1 | 9/2001 | Ito et al. |
| 6,336,187 B1 | 1/2002 | Kern et al. |
| 6,581,020 B1 | 6/2003 | Buote et al. |
| 6,681,198 B2 | 1/2004 | Buote et al. |
| 7,073,059 B2 | 7/2006 | Worely, Jr. et al. |
| 7,092,839 B2 | 8/2006 | Buote et al. |
| 7,292,993 B2 | 11/2007 | Uzzo et al. |
| 2003/0135576 A1 | 7/2003 | Bodin |
| 2004/0049294 A1 | 3/2004 | Keene et al. |
| 2004/0154040 A1 | 8/2004 | Ellis |
| 2005/0223242 A1 | 10/2005 | Nath |
| 2005/0223414 A1 | 10/2005 | Kenrich et al. |
| 2005/0240572 A1 | 10/2005 | Sung et al. |
| 2006/0095514 A1 | 5/2006 | Wang et al. |
| 2006/0149735 A1 | 7/2006 | DeBie et al. |
| 2006/0179061 A1 | 8/2006 | D'Souza et al. |
| 2006/0190925 A1 | 8/2006 | Ishii et al. |
| 2007/0079126 A1 | 4/2007 | Hsu et al. |
| 2007/0233709 A1 | 10/2007 | Abnous et al. |
| 2008/0043274 A1 | 2/2008 | Wang et al. |

METHOD AND SYSTEM FOR PROVIDING RESTRICTED ACCESS TO A STORAGE MEDIUM

CROSS-REFERENCE TO RELATED APPLICATIONS

This application is a Continuation-in-part of U.S. patent application Ser. No. 10/600,540 filed on Jun. 23, 2003, due to issue as U.S. Pat. No. 7,076,624 on Jul. 11, 2006; which was a Continuation application of U.S. patent application Ser. No. 10/032,467, now U.S. Pat. No. 6,654,864 issued Nov. 25, 2003; which was a Divisional application of U.S. patent application Ser. No. 09/267,787, now U.S. Pat. No. 6,336,175 issued Jan. 1, 2002; which claimed priority to Canadian Application 2,244,626 filed Jul. 31, 1998 and issued Jan. 31, 2000.

BACKGROUND OF THE INVENTION

1. Field of the Invention

The present invention relates to data storage and more particularly to a method of providing restricted write access on a data storage medium.

2. Related Art

In the past, operating systems restricted file access based on three criteria. The first criterion relates to the physical limitations of the storage device. For example, a CD-ROM drive only provides read access and therefore is restricted to read-only operation. The second relates to limitations of the storage medium. For example, a CD is a read-only medium, a CDR is a read/write medium but when a CD is full, the writer becomes a read-only medium, and so forth. The third relates to file access privileges. For example, in the UNIX operating system a file is stored with a set of access privileges including read and write privileges. Some files are read only and others are read/write and so forth.

Unfortunately, these access privileges fail to adequately provide protection for archival storage devices such as magnetic tape or removable optical media.

An example of a popular operating system is Windows NT® . . . Using Windows NT®., device drivers are hidden from applications by a protected subsystem implementing a programming and user interface. Devices are visible to user-mode programs, which include protected subsystems, only as named file objects controlled by the operating system input/output (IO) manager. This architecture limits an amount of knowledge necessary to implement device drivers and applications. In order to provide reasonable performance, the two separated systems, device drivers and applications, operate independently.

For example, when a write operation is requested by an application, the request is made via a file object handle. The application does not actually communicate with the storage device nor does the device driver for that storage device communicate with the application. Each communicates with the operating system independently. Thus, when the write command is issued for writing data to a device, the data is stored in buffer memory while the destination device is being accessed. A successful completion status is provided to the application. When the destination storage device is available, the stored data is written to the destination storage device. When the storage device is unavailable or fails to support write operations, the data is not successfully written. An error message may result, but will not be directed toward the application since it is not known to the device driver or is inaccessible. For example, the application may have terminated before the error occurs. Alternatively, no error message results and when the buffer is flushed or when the system is rebooted, the data is lost. Neither of these results is acceptable in normal computer use.

Fortunately, most devices are easily verified as to their capabilities. Read only devices are known as well as are read/write devices. Because a CD-ROM drive never becomes a read/write device, it is easily managed. When a device supports both read/write media and read only media the problem becomes evident.

In order better to highlight the problem, an example is presented. When a hard disk is full, accessing a file results in updating of file information relating to a last access date and so forth, journaling. File access information is updated each time a file is retrieved. The information requires no extra memory within the hard disk and therefore, the status of the hard disk, full or available disk space, is unimportant since the new file access information overwrites previous file access information. Thus, the file system writes to storage media even when full, so long as the capability of doing so exists.

When an archive data store is used with a data store device, it is often desirable that it not be written to. Therefore, accessing a file requires that the file access information is not updated—journaling is not performed. Unfortunately, when the data store device is accessed via a read/write file object handle, updating of the file access information is performed by the file system. As such, the data store is altered even when this is not desired. Further, since a single data store device accepts any number of different data stores during a period of time when the file system is in continuous operation, it is impractical if not impossible to remount the data store device with a new data store device driver and a new file object handle whenever the read/write privileges change. Currently, there is no adequate solution to overcome this problem.

In an attempt to overcome these and other limitations of the prior art, it is an object of the present invention to provide a method of limiting access privileges for a storage medium that supports increased flexibility over those of the prior art.

BRIEF SUMMARY OF THE INVENTION

In accordance with the invention there is provided a method of providing restricted access to a storage medium in communication with a computer comprising the step of: executing a file system layer on the computer, the file system layer supporting a plurality of file system commands; executing a trap layer on the computer, the trap layer logically disposed above the file system layer; providing to the trap layer at least a disabled file system command relating to the storage medium and supported by the file system for the storage medium; intercepting data provided to the file system layer including an intercepted file system command; comparing the intercepted file system command to each of the at least a disabled file system command to produce at least a comparison result; and, when each of the at least a comparison result is indicative of other than a match, providing the intercepted file system command to the file system layer.

In some embodiments an application layer is in execution logically above the trap layer such that the trap layer is logically disposed between the application layer and the file system layer; and when a comparison result from the at least a comparison result is indicative of a match, providing an error indication to the application layer. Preferably, the error indication is provided from the trap layer.

In accordance with the invention there is further provided a method of restricting access to a storage medium in communication with a computer, the method comprising the step of:

executing a file system layer on the computer, the file system layer supporting a plurality of file system commands; providing to the file system layer at least a disabled file system command for the storage medium, the disabled file system command supported by the file system for the storage medium, the at least a disabled file system command being other than all write commands, other than all read commands, and other than all write commands and all read commands; comparing file system commands provided to the file system layer to each of the at least a disabled file system command to produce at least a comparison result; and, when each of the at least a comparison result is indicative of other than a match, executing the file system command.

In an embodiment the method also comprises the following steps: providing an indication of a data write access privilege for the entire logical storage medium, the data write access privilege indicative of a restriction to alteration of a same portion of each file stored on the logical storage medium; and restricting file access to the logical storage medium in accordance with the indication while allowing access to free space portions of the same logical storage medium.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of a portion of each file stored within the logical storage medium, the indication other than a read only indication; and, restricting file access to each file within the logical storage medium in accordance with the same indication while allowing access to free space portions of the same logical storage medium. In an embodiment the indication comprises at least one of the following: write access without delete, write access without rename; write access without overwrite, and write access without changing file access privileges.

In accordance with the invention there is also provided a method of restricting access by a computer to a storage medium other than a write once medium in communication with the computer, the method comprising the steps of: providing an indication of a data write access privilege for the entire logical storage medium indicating a disabled operation relating to alteration of data within the logical storage medium, the indication other than a read only indication, the disabled operations supported by the storage medium; and restricting write access to data within the logical storage medium in accordance with the same indication while allowing access to free space portions of the same logical storage medium. A logical storage medium consists of a single physical storage medium or a single partition within a storage medium. Typically a disabled operation relates to destruction of data stored within a storage medium. Operations of this type include delete file, overwrite file, and rename file.

The present invention is preferably applied to removable storage media and more preferably to optical storage media such as removable optical rewritable disks.

According to an exemplary aspect of the present invention, restricted write access privileges for data stored within a data storage medium are supported. Advantageously, access privileges of this type allow write access to storage media or data files but limit that access in certain respects. These restrictions permit some level of control over a storage medium while providing some write privileges. An exemplary embodiment of the present invention may include, in an exemplary embodiment, a method for applying an operation access privilege to a storage medium, comprising: associating an access privilege with at least a portion of the storage medium; intercepting an attempted operation on said at least a portion of the storage medium, wherein said intercepting occurs regardless of an identity of a user attempting the attempted operation; comparing the attempted operation to the access privilege; and allowing, or denying the attempted operation based on comparing the attempted operation to the access privilege.

According to an exemplary aspect of the present invention, the method may include allowing or denying occurs transparently to the user and transparently to a computer application invoking the attempted operation.

According to an exemplary aspect of the present invention, the method may include wherein the storage medium is a logical storage medium.

According to an exemplary aspect of the present invention, the method may include, wherein the logical storage medium comprises one or more logical portions.

According to an exemplary aspect of the present invention, the method wherein the associating an access privilege with at least a portion of the storage medium comprises associating at least one of an enabled operation or a restricted operation.

According to an exemplary aspect of the present invention, the method may include where the allowing or denying the attempted operation further comprises allowing the attempted operation when the attempted operation matches one of the enabled operations.

According to an exemplary aspect of the present invention, the method may include: passing the attempted operation to a file system containing the storage medium.

According to an exemplary aspect of the present invention, the method may include where wherein the allowing or denying the attempted operation further comprises: denying the attempted operation when the attempted operation matches one of the restricted operations.

According to an exemplary aspect of the present invention, the method may further include modifying the attempted operation when the attempted operation matches one of the restricted operations, if the attempted operation can be modified from a restricted operation to an enabled operation.

According to an exemplary aspect of the present invention, the method may include where the operation access privilege is read-only for the logical storage medium.

According to an exemplary aspect of the present invention, the method may include where the logical storage medium may include logical portions and the operation access privilege comprises multiple operation access privileges wherein any number of the operation access privileges can be associated with each logical portion.

According to an exemplary aspect of the present invention, the method may include where the operation access privileges comprise at least one of the following: read, write, execute, move, rename, append, change permissions, change attributes, overwrite and/or overwrite zero length.

According to an exemplary aspect of the present invention, the method may include where the intercepting may further include intercepting file input/output attempted operations.

According to an exemplary aspect of the present invention, the method may include where attempted operations may include at least one of adding, deleting, converting and/or modifying.

According to an exemplary aspect of the present invention, the method may include where, the intercepting further comprises intercepting one or more logical device input/output attempted operations.

A method for applying an operation access privilege between a computer and a storage medium, may include associating an access privilege with at least a portion of said storage medium; intercepting an attempted operation on said at least a portion; comparing the attempted operation to the access privilege; and allowing or denying the attempted operation, wherein said allowing or denying occurs regardless of an identity of a user attempting said attempted operation.

According to an exemplary aspect of the present invention, the method may include applying an operation access privilege to a logical storage medium, comprising: associating an access privilege with at least a logical portion of the logical storage medium; intercepting an attempted operation on said at least a logical portion of the logical storage medium, wherein said intercepting occurs regardless of an identity of a user attempting said attempted operation; comparing the attempted operation to the access privilege; and allowing, or denying the attempted operation.

According to an exemplary aspect of the present invention, a method for applying an operation access privilege between a computer and a logical storage medium, may include, associating an access privilege with at least a logical portion of said logical storage medium; intercepting an attempted operation on said at least a logical portion; comparing the attempted operation to the access privilege; and allowing denying the attempted operation, wherein said allowing or denying occurs regardless of an identity of a user attempting said attempted operation.

A method of applying an operation access privilege to a logical storage medium in a file system, comprising: providing an operation access privilege indicative of at least one of an enabled operation and/or a restricted operation to be performed on at least one portion of the logical storage medium; associating said operation access privilege with said at least one portion of said logical storage medium; intercepting in a trap layer an attempted operation on said at least one portion; and passing said attempted operation to said file system if said attempted operation matches said enabled operation.

According to an exemplary aspect of the present invention, the method may include where the method may include modifying said attempted operation if said attempted operation does not match said enabled operation or said attempted operation matches said restricted operation; and passing said modified attempted operate to said file system.

According to an exemplary aspect of the present invention, the method may include where the method may include, further comprising denying said attempted operation at said trap layer if said attempted operation matches said restricted operation.

According to an exemplary aspect of the present invention, the method may further include where denying said attempted operation at said trap layer if said attempted operation does not match said enabled operation.

According to an exemplary aspect of the present invention, the method may include where A method for applying an operation access privilege to a storage medium, comprising: associating an access privilege with at least a portion of the storage medium; intercepting an attempted operation on said at least a portion of the storage medium; determining whether the attempted operation is an enabled operation or a restricted operation; and allowing or denying the attempted operation based on the determining whether the operation is an enabled operation or a restricted operation.

A method for applying operation access privilege to a logical storage medium based on file type, comprising: defining a rule for a logical portion of the logical storage medium that comprises a data identifier and an access privilege; intercepting an attempted operation on the logical portion of the logical storage medium, wherein said intercepting occurs regardless of an identity of a user attempting the attempted operation; comparing a data identifier associated with the attempted operation to the data identifier of the rule, and if matching, comparing the attempted operation to the access privilege; and allowing, or denying the attempted operation based on the comparing the attempted operation to the access privilege.

In an exemplary embodiment, data identifier includes a file type. The method according to claim 24, wherein the data identifier comprises at least one of the following: a data path, a data mask, and/or a unique file identifier.

A method for applying an operation access privilege to a storage medium, comprising: associating an access privilege with at least a portion of the storage medium; intercepting an attempted operation on said at least a portion of the storage medium based on a data identifier associated with the attempted operation, wherein said intercepting occurs regardless of an identity of a user attempting the attempted operation; comparing the attempted operation to the access privilege; and allowing, or denying the attempted operation based on the comparing the attempted operation to the access privilege.

BRIEF DESCRIPTION OF THE DRAWINGS

Exemplary embodiments of the invention will now be described in conjunction with the drawings in which.

DETAILED DESCRIPTION OF THE INVENTION

Figure 1:
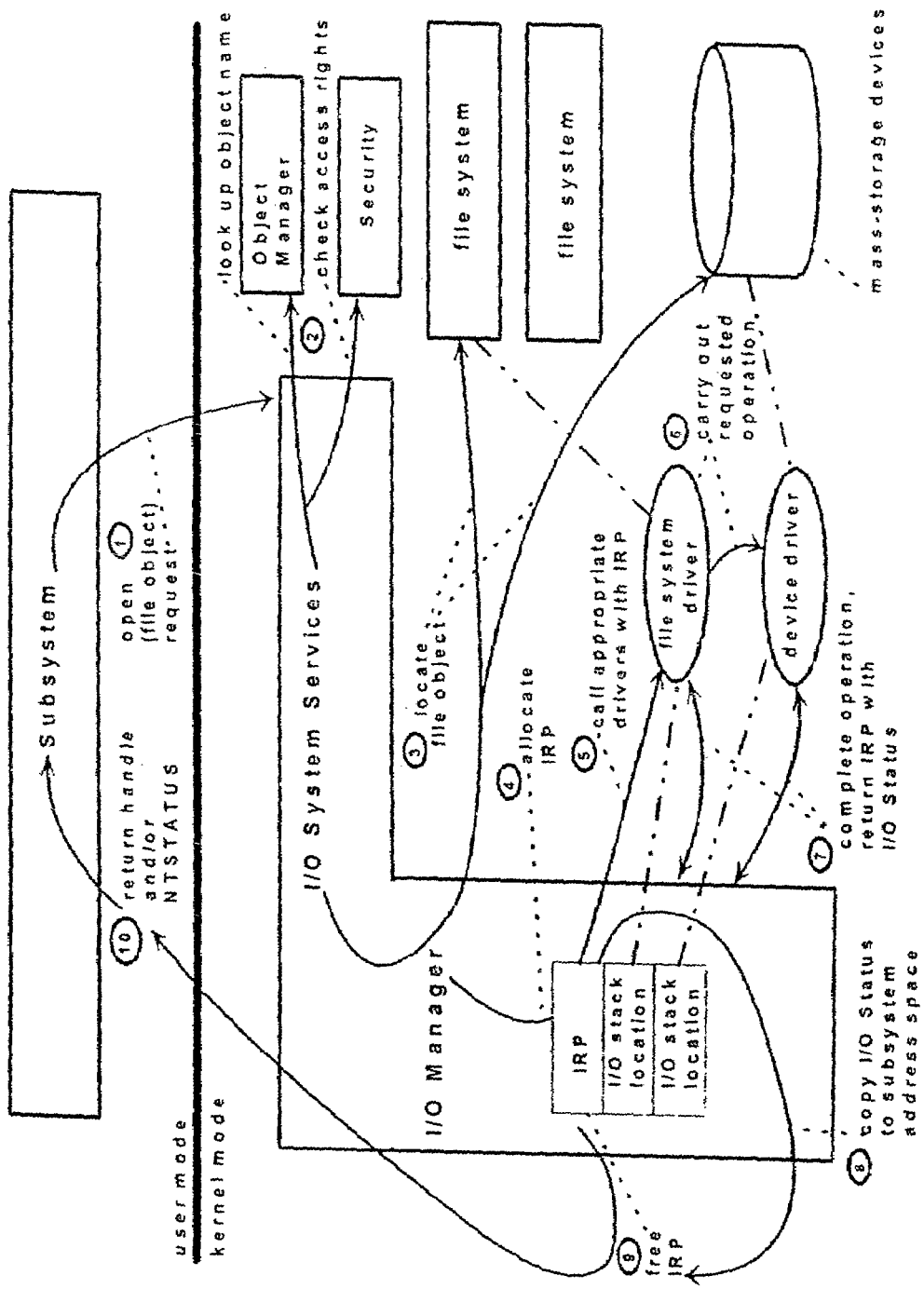
FIG. 1 is a simplified block diagram of an NT® operating system architecture during a process of opening a file is shown.

Referring to FIG. 1, a simplified block diagram of a Windows NT® (NT) operating system architecture during a process of opening a file is shown. NT drivers are hidden from end users by an NT protected subsystem that implements an already familiar NT programming interface. Devices are visible only as named file objects controlled by the NT Input/Output (IO) Manager to user-mode programs including protected subsystems.

An NT protected subsystem, such as the Win32® subsystem, passes IO requests to the appropriate kernel-mode driver through the IO system services. A protected subsystem insulates its end users and applications from having to know anything about kernel-mode components, including NT drivers. In turn, the NT IO Manager insulates protected subsystems from having to know anything about machine specific device configurations or about NT driver implementations.

The NT IO Manager's layered approach also insulates most NT drivers from having to know anything about the following: whether an IO request originated in any particular protected subsystem, such as Win32 or POSIX; whether a given protected subsystem has particular kinds of user-mode drivers; and, the form of any protected subsystem's IO model and interface to drivers.

The IO Manager supplies NT drivers with a single IO model, a set of kernel-mode support routines. These drivers carry out IO operations, and a consistent interface between the originator of an IO request and the NT drivers that respond to it results. File system requests are a form of IO request.

A subsystem and its native applications access an NT driver's device or a file on a mass-storage device through file object handles supplied by the NT IO Manager. A subsystem's request to open such a file object and to obtain a handle for IO to a device or a data file is made by calling the NT IO system services to open a named file, which has, for example, a subsystem-specific alias (symbolic link) to the kernel-mode name for the file object.

The NT IO Manager, which exports these system services, is then responsible for locating or creating the file object that represents the device or data file and for locating the appropriate NT driver(s).

The system follows a process described below in accordance with FIG. 1 for performing a file open operation. The subsystem calls an NT IO system service to open a named file. The NT IO Manager calls the Object Manager to look up the named file and to help it resolve any symbolic links for the file object. It also calls the Security Reference Monitor to check that the subsystem has the correct access rights to open that file object.

If the volume is not yet mounted, the IO Manager suspends the open request, calling one or more NT file systems until one of them recognises the file object as some thing it has stored on one of the mass storage devices the file system uses. When the file system has mounted the volume, the IO Manager resumes the request.

The IO Manager allocates memory (a RAM Cache) for and initialises an IRP (IO request packet) for the open request. To NT drivers, an open is equivalent to a "create" request. The IO Manager calls the file system driver, passing it the IRP. The file system driver accesses its IO stack location in the IRP to determine what operation to carry out, checks parameters, determines if the requested file is in cache memory, and, if not sets up the next lower driver's IO stack location in the IRP.

Both drivers process the IRP and complete the requested IO operation, calling kernel-mode support routines supplied by the IO Manager and by other NT components. The drivers return the IRP to the IO Manager with the IO status block set in the IRP to indicate whether the requested operation succeeded and/or why it failed. The IO Manager gets the IO status from the IRP, so it can return status information through the protected subsystem to the original caller. The IO Manager frees the completed IRP.

The IO Manager returns a handle for the file object to the subsystem if the open operation was successful. If there was an error, it returns appropriate status information to the subsystem.

After a subsystem successfully opens a file object that represents a data file, a device, or a volume, the subsystem uses the returned file object handle to request that device for IO operations typically in the form of read, write, or device IO control requests. These operations are carried out by calling the IO System services. The IO Manager routes these requests as IRPs sent to appropriate NT drivers.

Figure 2:
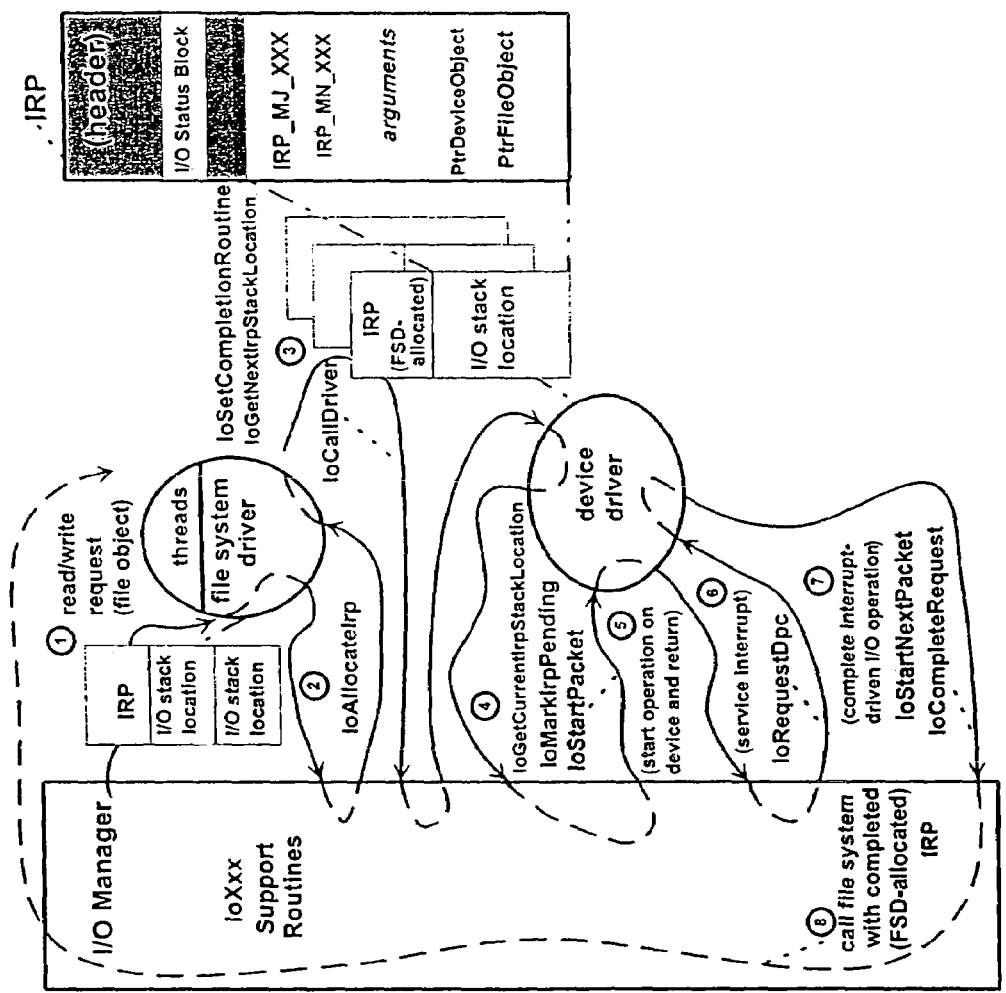
FIG. 2 is a simplified block diagram of an NT® operating system architecture during a process of IRP processing is shown.

Referring to FIG. 2, a simplified block diagram of an NT® operating system architecture during a process of IRP processing is shown. The IO Manager calls the file system driver (FSD) with the IRP it has allocated for the subsystem's read/write request. The FSD accesses its IO stack location in the IRP to determine what operation it should carry out.

The FSD sometimes breaks the originating request into smaller requests by calling an IO support routine one or more times to allocate IRPs, which are returned to the FSD with zero-filled IO stack location(s) for lower-level driver(s). At its discretion, the FSD can reuse the original IRP, rather than allocating additional IRPs as shown in FIG. 2, by setting up the next-lower driver's IO allocation in the original IRP and passing it on to lower drivers.

For each driver-allocated IRP, the FSD calls an IO support routine to register an FSD-supplied completion routine so the driver is able to determine whether a lower driver satisfied the request and free each driver allocated IRP when lower drivers have completed it. The IO Manager calls the FSD-supplied completion routine whether each driver-allocated IRP is completed successfully, with an error status, or cancelled. A higher-level NT driver is responsible for freeing any IRP it allocates and sets up on its own behalf for lower-level drivers. The IO Manager frees the IRPs that it allocates after all NT drivers have completed them. Next, the FSD calls an IO support routine to access the next lower-level driver's IO stack location in its FSD-allocated IRP in order to set up the request for the next-lower driver, which happens to be the lowest-level driver in FIG. 2. The FSD then calls an IO support routine to pass that IRP on to the next driver.

When it is called with the IRP, the physical device driver checks its IO stack location to determine what operation (indicated by the IRP MJ XXX function code) it should carry out on the target device, which is represented by the device object in its IO stack location and passed with the IRP to the driver. This driver can assume that the IO Manager has routed the IRP to an entry point that the driver defined for the IRP-MJ XXX operation (here IRP MJ READ or IRP MJ WRITE) and that the higher-level driver has checked the validity of other parameters for the request.

If there were no higher-level driver, such a device driver would check whether the input parameters for an IRP MJ XXX operation are valid. If they are, a device driver usually calls IO support routines to tell the IO Manager that a device operation is pending on the IRP and to either queue or pass the IRP on to another driver-supplied routine that accesses the target device in the form of a physical or logical device such as a disk or a partition on a disk.

The IO Manager determines whether the device driver is already busy processing another IRP for the target device, queues the IRP if it is, and returns. Otherwise, the IO Manager routes the IRP to a driver-supplied routine that starts the IO operation on its device.

When the device interrupts, the driver's interrupt service routine (ISR) does only as much work BS as is necessary to stop the device from interrupting and to save necessary context about the operation. The ISR then calls an IO support routine with the IRP to queue a driver-supplied DPC routine to complete the requested operation at a lower hardware priority than the ISR.

When the driver's DPC gets control, it uses the context as passed in the ISRs call to IoRequestDpc to complete the IO operation. The DPC calls a support routine to dequeue the next IRP when present and to pass that IRP on to the driver-supplied routine that starts IO operations on the device. The DPC then sets status about the just completed operation in the IRPs IO status block and returns it to the IO Manager with IoCompleteRequest.

The IO Manager zeroes the lowest-level driver's IO stack location in the IRP and calls the file system's registered completion routine with the FSD-allocated IRP. This completion routine checks the IO status block to determine whether to retry the request or to update any internal state maintained about the original request and to free its driver-allocated IRP. The file system often collects status Information for all driver-allocated IRPs it sends to lower-level drivers in order to set IO status and complete the original IRP. When it has completed the original IRP, the IO Manager returns NT status, the subsystem's native function, to the original requestor of the IO operation.

FIG. 2 also shows two IO stack locations in the original IRP because it shows two NT drivers, a file system driver and a mass-storage device driver. The IO Manager gives each driver in a chain of layered NT drivers an IO stack location of its own in every IRP that it sets up. The driver-allocated IRPs do not necessarily have a stack location for the FSD that created them. Any higher-level driver that allocates IRPs for lower-level drivers also determines how many IO stack locations the new IRPs should have, according to the StackSize value of the next-lower driver's device object.

An NT file system driver accesses the file object through its IO stack location in IRPs. Other NT drivers usually ignore the file object.

The set of IRP major and minor function codes that a particular NT driver handles are sometimes device-type-specific. However, NT device and intermediate drivers usually handle the following set of basic requests: IRP MJ CREATE—open the target device object, indicating that it is present and available for IO operations; IRP MJ READ—transfer data from the device; IRP MJ WRITE—transfer data to the device; IRP MJ DEVICE CONTROL—set up or reset the device according to a system-defined, device, specific IO control code; and IRP MJ CLOSE.about.close the target device object.

In general, the IO Manager sends IRPs with at least two IO stack locations to device drivers of mass-storage devices because an NT file system is layered over NT drivers for mass-storage devices. The IO Manager sends IRPs with a single stack location to any physical device driver that has no driver layered above it.

Figure 3:
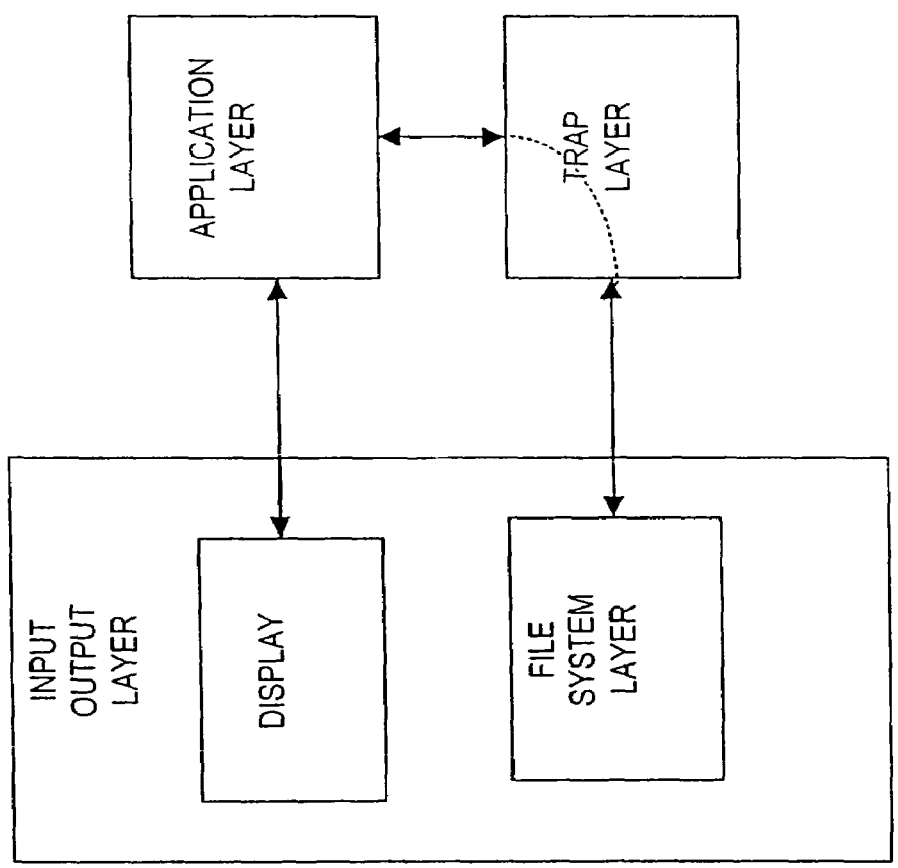
FIG. 3 is a simplified block diagram of an operating system according to the invention.

Referring to FIG. 3, a block diagram of an operating system is shown. The block diagram presents a simplified view of operating system functionality according to the invention. An application layer for supporting application execution communicates with an input/output layer of the computer. The input/output layer includes a display and a file system layer. The application layer communicates with the file system layer for performing read operations and write operations with storage media. Disposed between the application layer and the file system layer is a trap layer also referred to as a filter layer. Each file system access request that is transmitted from the application layer to the file system layer is intercepted by the trap layer. In the trap layer restrictions relating to access privileges are implemented. For example, some requests are blocked and error messages are returned to the application layer. Other requests are modified and the modified request passed onto the file system. When a data store is read only, a request to open a file for read write access is modified to an open file for read-only access; a request to delete a file is blocked and an error message is returned. The use of a trap layer is applicable when the present invention is implemented within an existing operating system such as Windows NT®. Alternatively, an operating system supporting restricted write access is designed and restrictions relating to access privileges are implemented within the file system layer.

Figure 4:
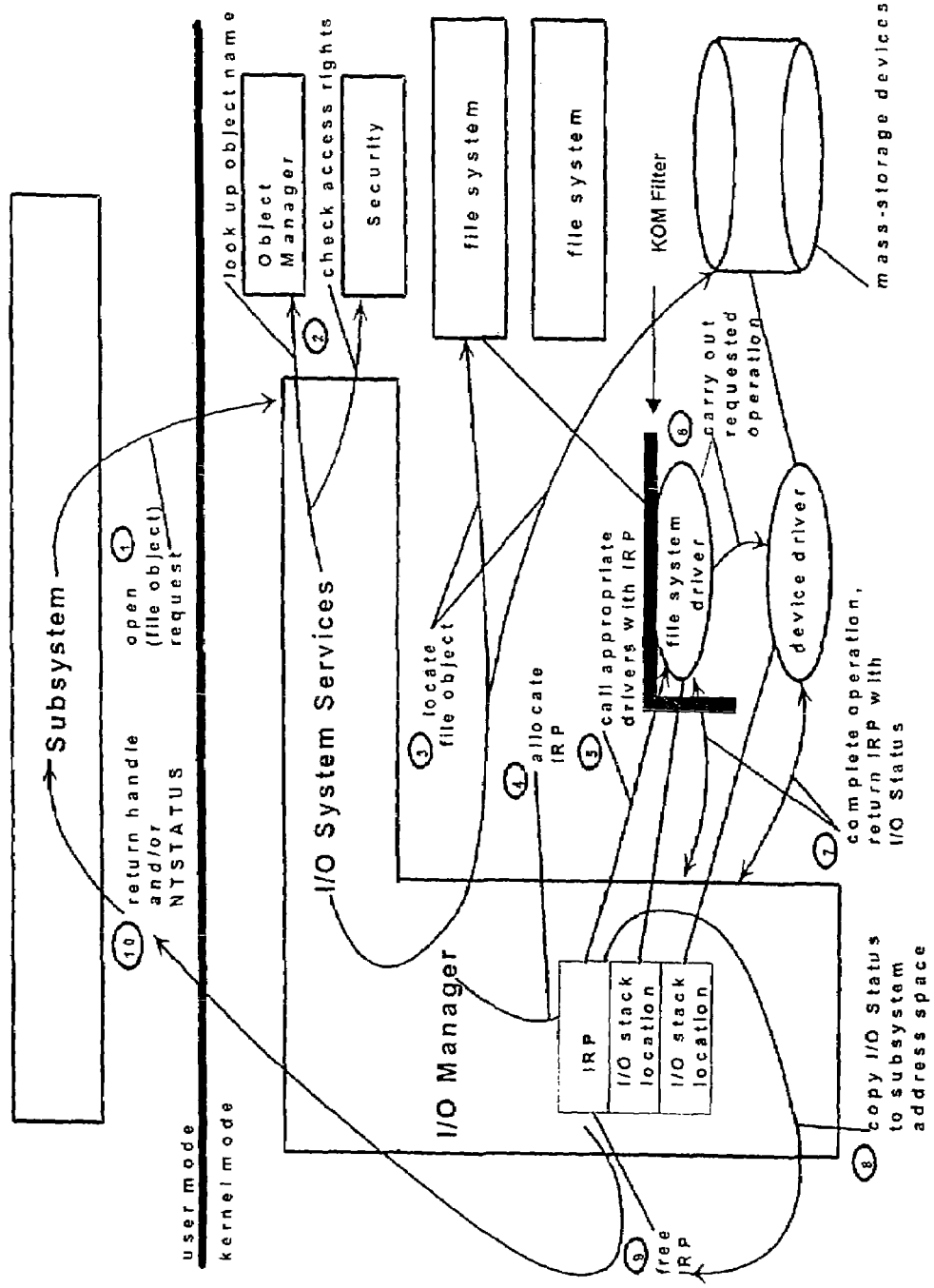
FIG. 4 is a simplified block diagram of a system for opening a file such as that shown in FIG. 1 modified according to the invention.

Referring to FIG. 4, a simplified block diagram of opening a file within Windows NT® according to the invention is shown. The diagram is based on the diagram of FIG. 1. The thick black line represents the trap layer or filter layer for preventing some file system operations from passing from the application layer to the file system layer. Accordingly, a data store device operates as a read/write device with a single device driver. The trap layer prevents write operations or, alternatively, other predetermined operations from being performed on a specific data store. The trap layer achieves this by blocking some requests and by modifying other requests. In this way, some operations are prevented without requiring modifications to existing applications. Thus, one data store may be read only while another is read/write. Unlike prior art implementations, an application requesting a write operation to a data store that is read-only, receives an accurate and appropriate error message. There is no data lost by the device driver and, in fact, the device driver is freed of the trouble of dealing with file system commands which cannot be completed.

Also, the use of the trap layer allows for implementation of more complicated file access privileges based on data stored within each individual storage medium. For example, a storage medium may indicate read-write access but may not support delete operations. Device drivers perform low level commands such as read and write. Delete, is a write operation, the device driver performing write operations to obfuscate of overwrite a file. As is evident, the device driver supports delete operations as does any read/write data store. However, by indicating to the trap layer that delete operations are not supported, all delete requests passed from the application layer for the specific data store are intercepted by the trap layer and an error message is returned to the application layer. No delete operation for a file is passed to the file system layer and therefore, the device driver does not perform the write operations for obfuscating or overwriting the file because none is received. It is evident that preventing file deletion is advantageous for protecting archived data and data histories.

Another operation which is advantageously restricted is overwriting of files. When a request is made to overwrite a file, typically the data within the file is overwritten. Overwriting of file data is a simple work around to perform a file delete when that operation is blocked. Alternatively in some devices, the data to overwrite is written to an unused portion of a storage medium and an address of the file data within a file allocation table is changed. The storage locations of the old file data are then considered free. Preventing data overwrite is performed according to the invention by modifying requests or blocking requests as necessary. Further, by trapping requests to overwrite file data according to the invention, a user friendly error message becomes possible. When an application provides a request to overwrite a file, an error message indicating that overwrite is not permitted and that a file name is needed to save the data is provided. The trap layer, upon receiving the file name from the error message, modifies the request in accordance therewith and in accordance with permitted operations and passes the modified request to the file system layer. Accordingly, data integrity is preserved with minimal inconvenience to users of the system.

It is also useful to restrict access to file access permissions. Often, permissions are global across a storage medium and altering of the permissions is not desirable. Still, many operating systems provide for file and storage medium related access privileges. These are modifiable at any time. Since privileges are generally static, there are advantages to setting up privileges for a storage medium such that during normal operation and with normal file system operations, the privileges are static. Preferably, there is at least a way to modify the global privileges in case it is desirable to do so. Preventing alteration of privileges prevents individuals having access to files from modifying access privileges in any way.

Another operation that is usefully restricted is overwriting of zero length files. Some operations within some applications create a zero length file and then overwrite it. Thus preventing overwriting of zero length files directly affects those applications. An example of such an application and operation is the "save as" command in Microsoft Word®. Thus, preventing overwriting of zero length files effectively prevents "save as" from functioning on the associated medium.

Similarly, renaming a file is useful for obfuscating data. Preventing renaming of files prevents hiding existing files or making them more difficult to locate. For example, changing a client's information file name from "Client 101 Information" to "To Do Feb. 18" would make the file hard to locate. Thus, rename is an operation that it is desirable to restrict. Reasons for restricting the other listed operations are evident. Further, restricting other operations may also be advantageous and the present application is not limited to these operations.

Above mentioned operations which are advantageously restricted include overwriting files, changing file access permissions and medium access privileges, renaming files, formatting a medium and so forth. For example, a medium that does not allow any of the above mentioned operations provides a complete archival history of the medium's content and prevents alteration or deletion of the data. Such a medium is very useful for backing up office files or electronic mail.

Figure 5:
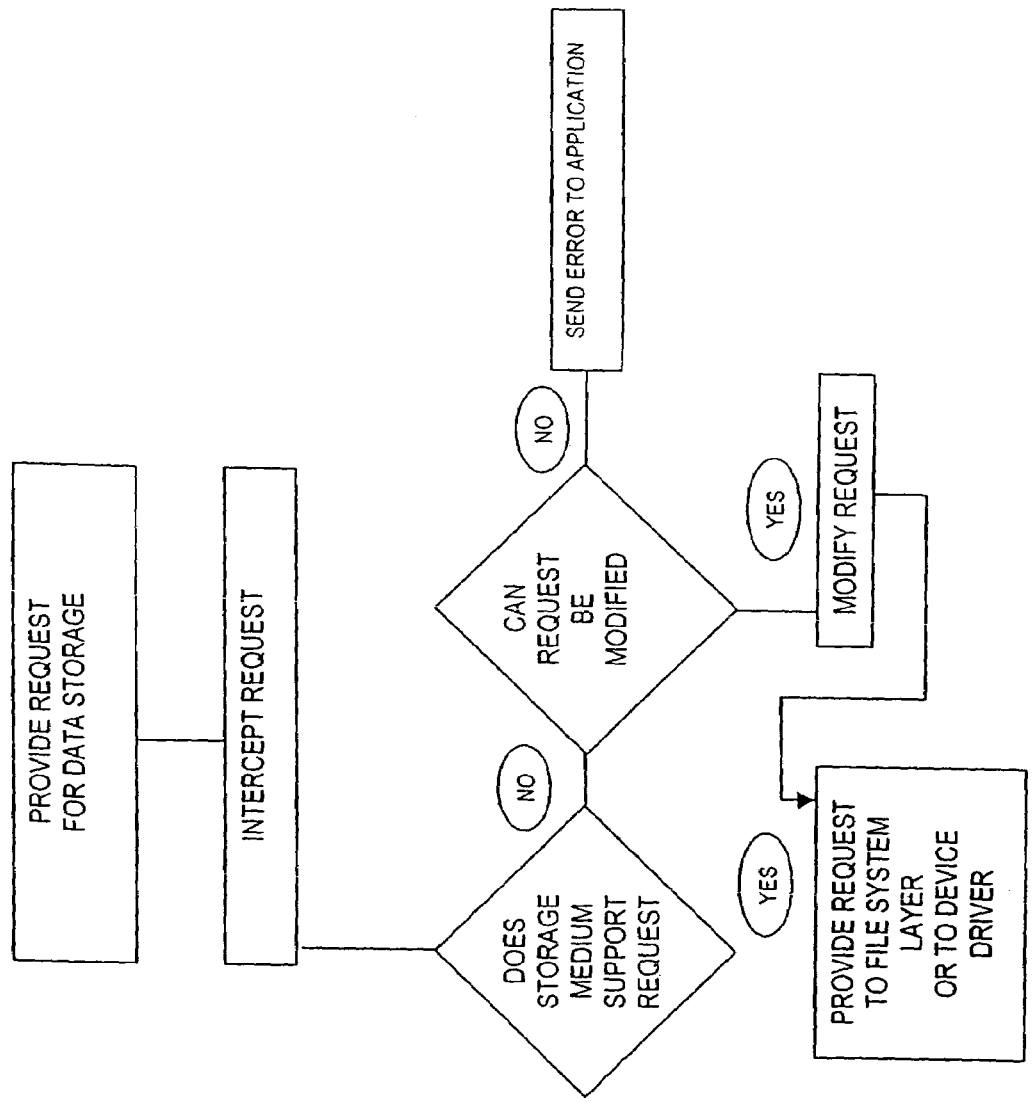
FIG. 5 is a simplified flow diagram of a method of storing data in a storage medium forming part of a system such as that of FIG. 1.

Referring to FIG. 5, a flow diagram of a method of storing data in a storage medium forming part of a system such as that of FIG. 3 is shown. An application in execution on the system seeks to store a data file on a storage medium within the file system layer of the system. A request and data for storage within the file is transmitted from the application layer to the file system layer. The request includes an operation and data relating to a destination storage medium on which to store the data. The trap layer intercepts the request and the data and determines whether the storage medium selected supports the operation. When the storage medium supports the operation, the request and the data is passed on to the file system layer. When necessary, the request is modified prior to provision to the file system layer. In the file system layer the operation is conducted according to normal file system layer procedures. When the storage medium does not support the operation in its original or a modified form, the trap layer returns an indication of this to the application layer. The operation and the data are not passed onto the file system layer. This provides additional access privilege functionality.

Figure 6:
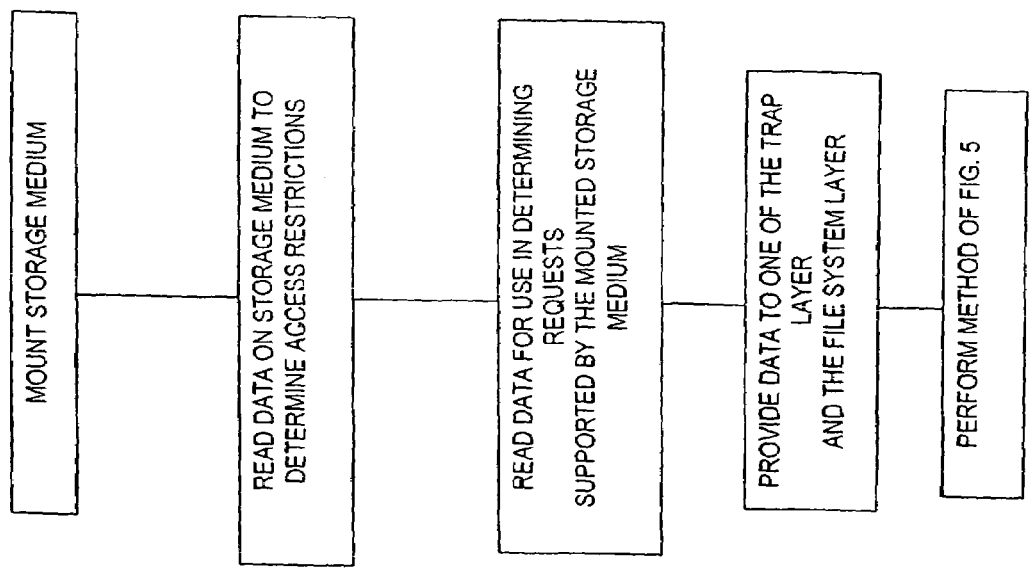
FIG. 6 is a simplified flow diagram of a method of providing software settable access privileges within Windows NT®; and, FIG. 7 is a simplified block diagram of the invention wherein the file system layer includes means for performing the functions of the trap layer.

Referring to FIG. 6, a simplified flow diagram of a method of providing software settable access privileges within Windows NT® is shown. A storage medium is mounted within a computer system. The storage medium has stored thereon data relating to access privileges for the storage medium. Upon mounting the storage medium, data relating to physical limitations of the read/write device are loaded into the device driver for that device within the file system layer. The limitations are recognised by the system software. Also upon mounting the storage medium, the data relating to access privileges for the storage medium are loaded into the trap layer. The trap layer limits operations performed on the storage medium to those supported by the read/write device by limiting the requests passed onto the file system layer or, when the trap layer forms part of the file system layer, by filtering and/or modifying the requests. The data relating to access privileges for the storage medium are used to limit those requests provided to the file system layer.

When the storage medium is a data store for archiving purposes, there are evident advantages to treating the storage medium as a read-only storage medium. For example, once the data store is full, setting it to read-only allows its use without risking tampering or accidental modification. Therefore, media specific access privileges are advantageous.

Figure 7:
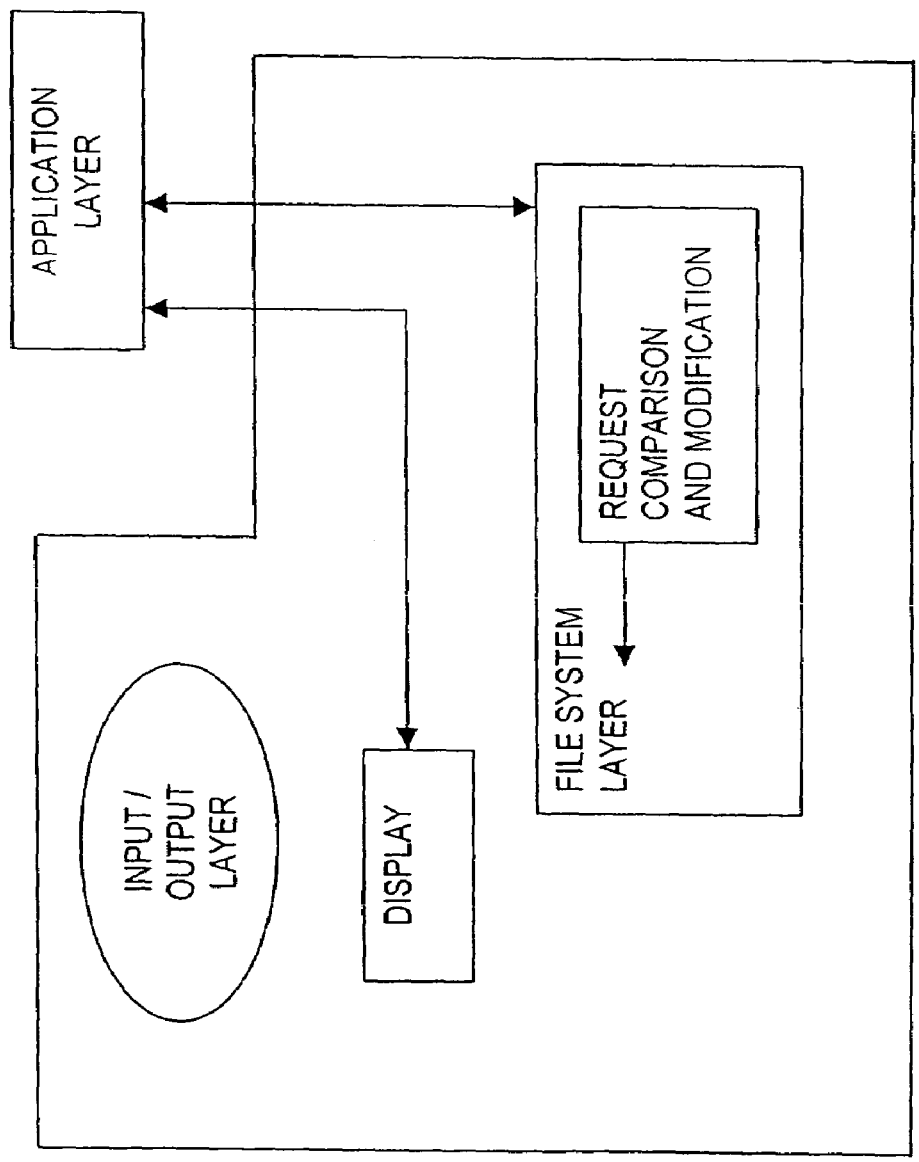

Referring to FIG. 7, a simplified block diagram of the invention wherein the file system layer includes means for performing the functions of the trap layer is shown. Such an embodiment, operates in a similar fashion to those described above. The file system receives all file access requests and compares them to those that are not permitted. When an access command is not permitted on an indicated storage medium, an error message is returned to the application layer. When an access command is permitted, it is performed on the appropriate storage medium. The access command may be that requested or, alternatively, a modified form of the requested command resulting in a supported operation.

The term logical storage medium is used herein and in the claim that follow to designate either a physical storage medium or a portion of physical storage medium that is treated by the operating system as a separate storage medium. Thus, a partitioned hard disk with two partitions consists of one physical storage medium and two logical storage media.

According to an exemplary embodiment, a trap layer may be provided, which may intercept requests, and then may do something with the request. For example, in an exemplary embodiment, if the request is deemed permissible, it may be allowed. On the other hand, if the request is deemed not allowed, then the request may be denied. According to another exemplary embodiment, in the event that the request is not allowed, if possible, it may be modified and then perhaps allowed in an exemplary embodiment, as modified. In an exemplary embodiment, the trap layer may be set to intercept requests based on a predefined policy or setting.

According to an exemplary embodiment, the trap layer may be a transparent trap layer. In an exemplary embodiment, the trap layer may intercept requests transparently to the user. In another exemplary embodiment, the trap layer may intercept requests transparently to a computer application invoking the requests. According to another exemplary embodiment, the trap layer may intercept requests based on a predefined policy and/or setting.

According to another exemplary embodiment, the computing environment may be any of various well known computing environments. For example, the computing environment may include a WINDOWS® environment, in an exemplary embodiment. In another exemplary embodiment, the computing environment may include, e.g., but not limited to, any computer operating environment including, e.g., but not limited to, a real file system environment, an advanced file system, an HPFS file system, an NTFS file system, a UNIX file system, a Solaris file system, an Apple file system, an AIX file system, an extended file system on Unix, etc.

A file lifecycle may include an entire existence of a file from the moment of creation through transitions such as moves, renames, retention, preservation or archiving, etc., up until destruction. File operations may include, e.g., but not be limited to, creating; storing; moving; protecting; preserving; archiving; retaining logically or physically, in for example write-once-read-many (WORM) form; deleting; overwriting; replicating; preventing the creation of a particular type of file (for example, an MP3 file) in, for example, a directory; etc.

It is important to note that the whole concept of data protection and data preservation is being extended into the logical space rather than the traditional physical space. The reality is that information that we need will have to remain accessible throughout its existence. The traditional concepts of archiving and preserving information where based on the use of physical WORM Write-Once-Read-Many devices and media, though realistically this is unreasonable. Technology continues to change and given the continuous evolution, it is impractical to assume that we will be able to connect the same old hardware 50 years in the future to the newer operating systems and newer servers and expect that the data will remain accessible. In reality, hardware will become obsolete and that in no way minimizes the need to preserve valuable information. In real life, each day we move valuable information and property such as our wallets, keys, cell phones and PDAs and we take them with us. The fact remains that we will continue to carry them as long as we need the information or the tools. Once they are no longer needed, we will no longer carry them. The fact that we carry our wallet with us does not dictate that we will continue to use the same wallet forever or that we will maintain the same contents. What is always true is that as long as the specific contents are categorized as important we will continue to maintain them and transfer them to newer wallets. A concept of data preservation and protection embodied in examples of the invention revolves around providing the protection independent of the physical storage enabling the infrastructure to evolve while preserving and securing the data. We are creating a logical WORM that will allow the user to utilize the storage resources of choice, for example spinning disk, to achieve and meet compliance and legislated data preservation and retention obligations on any storage technology that meets the business needs and requirements.

We have several variations of policies that apply:

EXAMPLE 1

We would allow the creation of a new file. The file would be created in an unrestricted mode allowing any and all aspects of the file to be modified such as size, name, data attributes and times. Once the file is closed we would automatically enforce the restrictions. In other words Create is allowed. In this case we would use that privilege to allow the file to be created. At this point the file is opened in a read/write mode allowing all other operations to be allowed. Once we close the file then the next operation would be to open an existing file and not a creation operation. At this point we would evaluate against the other access privileges such as overwrite, append, change attributes, change permissions, overwrite zero length. If the operation is not allowed we would simply deny it.

EXAMPLE 2

We would allow the creation of a new file. The file would be created in an unrestricted mode allowing any and all aspects of the file to be modified such as size, name, data attributes and times. Once the file is closed we would automatically enforce the restrictions unconditionally. Rendering the file effectively archived upon close operation.

EXAMPLE 3

We would allow the creation of a new file. The file would be created in an unrestricted mode allowing any and all aspects of the file to be modified such as size, name, data attributes and times. The file will remain in an unrestricted mode until an predefined event occurs then we would change the restrictions for allow everything to deny any modifications and only allow read operations. The way this works underneath is that the file is opened and then a change such as changing the file attribute to read-only would trigger the change in the access privilege. The actual evaluation of the access privilege is evaluated on the file open operation. Usually the intentions of the user and/or application have to be declared at the time of the open operation.

The open file intentions include whether the file is opened for read-only or for read-write or opened to change attributes or opened for changing permissions, or opened for append or opened for changing file times (creation, last modification or last access times) or opened for rename or opened for move operations.

The open operation is a critical part of the access privilege evaluation process.

The policies for access privilege also enforce retention enforcing restrictions that prohibit modifications on retained files. These restrictions may encompass prohibiting all modifications or in some cases allowing some operations that do not affect the integrity of the user data. In other words it is conceivable with our logic to allow file security permissions to be modified since they only affect who can access the file and do not change the contents of the file.

Retained files typically have certain restrictions that cannot be changed such as rename, move, overwrite, overwrite zero length and delete that will always be denied on a retained file.

Retained files can be assigned an expiry time that may be derived or from adding a time period to the last modification date and time of the file.

A file may be retained for ever and have no expiry time assigned. The expiry time for a file may be extended.

A file may be retained for an indefinite time period allowing an expiry time to be assigned in the future.

Once a file is retained its contents "user data will never be modifiable. An expired file may be either deleted or have the expiry time extended.

Retention expiry time may be assigned directly by the user using private IOCTLs or an application.

Retention expiry may be derived by setting the last access time and then triggering the file to be in a retained state.

The retention trigger may be an event such as changing the state of the read-only attribute, but is not limited to only changing this specific attribute.

(a) The user can define a number of triggers including the permissions or who the owner of the file is.

(b) The retention policy can include exclusion rules that would exclude files that meet that criteria from being retained. These rules include such parameters as data identifiers like path, name, mask, extension, size, attribute, permissions, file creation time and file modification time.

(c) The retention policy can include inclusion rules that would include files that meet that criteria to be retained. These rules include such parameters as data identifiers like path, name, mask, extension, size, attribute, permissions, file creation time and file modification time.

In the event of using the last access time to set the file retention expiry;
  (a) if the last access time is zero then the file is retained for ever and it will never expire. The user/application will not be able to change the last access time.
  (b) if the last access time is equal to the last file modification time then the file is retained indefinitely until it is set to have an expiry time. To set the expiry time on a file that is retained indefinitely the last access time is modified to a date and time that is greater than the last modification time. Once the expiry time is reached then the file will be expired and may be deleted.
  (c) If the last access time is set to a value greater than the last modification date then that would be used as the expiry time of the retention.
In the event of using an independent file expiry time to set the file retention expiry;
  (a) if the expiry time is set to 0xFFFFFFFFFFFFFF then the file is retained for ever and it will never expire. The user/application will not be able to change the expiry time.
  (b) if the expiry time is equal to 00:00:00 Thurs. Jan. 1, 1970 then the file is retained indefinitely. A file that is retained indefinitely may be assigned an expiry time. Assigning an expiry time is the only way to expire an indefinitely retained file, until an expiry time it is set to have an expiry time.
    (i) To set the expiry time on a file that is retained indefinitely the expiry is modified to a date and time that is greater than zero or it's equivalent which may be 00:00:00 Thurs. Jan. 1, 1970. Once the expiry time is reached then the file will be expired and may be deleted or the expiry time may be extended.
    (ii) For simplification purposes we have introduced a variation that allows the expiry time to be set to now meaning that the file will be rendered expired as of the current time, literally rendering the file expired.
  (c) If the retention expiry time is set to a value greater than zero or it's equivalent 00:00:00 Thurs. Jan. 1, 1970 then that would be used as the expiry time of the retention.
The retention policy expiry can be suspended indefinitely in the event of litigation to prevent valuable files directories and documents from being accidentally destroyed while the litigation is still on going
The access privilege policy have been extended to control the type of file that may be created using a data identifier and other qualifiers to prohibit the creation of certain types of files or allow them. The qualifiers include file mask, file name, file extension, owner and path. This ability is referred to as file screening where the administrator can define policies that would prohibit personal files such as mp3 and mpg files from being stored on corporate storage resources.
Lastly but not least it is conceivable with the availability of access to the sources of open operating systems and file systems to add the trap layer directly into the file system layer to enforce the protection and retention of files.
The trap layer will store the file protection policies with the actual file:
  (a) The policy may be stored as an alternate data stream.
  (b) The policy may be stored as an extended attribute.
  (c) The policy may be stored as private reparse data.

The trap layer will have policies to manage directory operations such as:
  (a) create sub-directory, rename sub-directory, move sub-directory out, move sub-directory in, delete sub-directory
  (b) create file, rename file, move file in, move file out, rename file, delete file, change file attributes, change file permissions, read file,
  (c) browse directory—the feature prohibits applications and users that do not know the actual names of the files and sub-directories from being able to browse the contents of the managed logical storage medium. This is an important feature that enables the customers to enforce privacy requirements by limiting the access to the contents to processes that know exactly the name and path of the files they are trying to access. Any attempt to browse the contents in applications like Windows explorer would fail regardless of the user and or application. The added benefit is that third party applications can provide more realistic logs that would reflect the fact that all access to secure content is restricted to their own applications and context. This is important for such legistlation like HIPAA (US) and PIPEDA (Canada).
The trap layer may create hash keys that will be used to validate the authenticity of the retained files.
  (a) The trap layer may be configured to validate the hash key on every open operation and failing the operation if the hash key does not match.
  (b) The trap layer may be invoked to validate any file on demand by an external operation triggered by the user and/or application.
The trap layer may create hash keys for all files that are created in managed logical and/or physical storage mediums
The trap layer may automatically encrypt files that are created in managed logical and/or physical storage mediums. The encryption and decryption will happen independent of the user and or application. This enforces security requirements that would prohibit protected files from being accessed outside the context and control of the trap layer.
The trap layer can force secure erasure of files that are being deleted. Secure erasure is a required by such compliance requirements such as DOD 5015.2 which require that file contents that are being deleted to be overwritten with random patterns that would ensure that they could never be restored.
The trap layer may obfuscate the user data by storing it in alternate data streams or alternate locations rendering the files unreadable and even as far as inaccessible outside the context of the trap layer.
The term out side the context of the trap layer means that if the trap layer was some how disabled or if the trap layer was de-installed or the storage device was moved and connected to another server that did not have the trap layer installed.
The trap layer has a private interface that would also protect and prohibit the trap layer from being de-installed or deleted if the case that there are retained files under it's control. This allows the trap layer to be upgraded but not disabled.
To enforce the retention expiry times, the trap layer utilizes a secure clock that is used to maintain the system clock current.
The algorithm utilized to secure the system time is based on the fact that the secure clock is synchronized with GMT.

Regardless of the time zone the server time is always represented as a variation of GMT. That means that if the server time zone is EST which is equal to GMT-5, then the server time will have to always maintain the same time difference. To achieve this goal there is a process that will monitor the server time and compare it to the secure clock and reset the server time to always maintain the same time difference.

The trap layer would render the managed storage volumes read-only in the vent that the secure clock is removed, prohibiting files from expiring or being deleted. And even from being created until such time as the clock is restored.

The secure time mechanism authenticates the clock to ensure that it is a sanctioned or authorized clock so that the system cannot be spoofed.

The secure clock must be able to sustain itself independent of the server power to eliminate any time lapses. That means that even if the server is shutdown for a long duration or even if the motherboard is replaced or reset, when the server is booted up again the time will be reset in accordance with the difference from the secure clock time, which in this particular example is GMT-5.

Numerous other embodiments of the invention may be envisaged without departing from the spirit and scope of the invention.

What is claimed is:

1. A method for applying an operation access privilege to a storage medium, comprising:
    associating an access privilege with at least a portion of the storage medium;
    intercepting an attempted operation on said at least a portion of the storage medium, wherein said intercepting occurs regardless of an identity of a user attempting the attempted operation;
    comparing the attempted operation to the access privilege; and
    allowing, or denying the attempted operation based on comparing the attempted operation to the access privilege.

2. The method according to claim 1, further comprising enforcing at least one policy.

3. The method according to claim 2, further comprising managing an operation in regards to said at least one policy.

4. The method according to claim 3, wherein said operation comprises at least one of: creating a sub-directory, renaming a sub-directory, moving a sub-directory out, moving a sub-directory in, deleting-a subdirectory, creating a file, moving a file in, moving a file out, renaming a file, deleting a file, changing file attributes, changing file permissions, reading a file, writing a file, executing a file, appending a file, changing file permissions, overwriting a file, or browsing a directory.

5. The method according to claim 2, wherein said at least one policy regards a new logical file, said policy comprising at least one of:
    creating the new logical file with at least one associated access privilege for an operation enabled; or
    disabling at least one enabled associated access privilege upon at least one of a close operation on said new logical file or an occurrence of an event.

6. The method according to claim 2, wherein said enforcing comprises storing said at least one policy with at least one of: an alternate data stream, an extended attribute, or a private data.

7. The method according to claim 2, wherein said enforcing comprises at least one of: including or excluding application of said at least one policy to said at least a portion of the storage medium based on an attribute of data.

8. The method according to claim 7, wherein said attribute of data comprises at least one of:
    a type comprising at least one of a MP3 file, an audio file, a multi-media file, a video file, a text file, or an image file;
    a data path;
    a data mask;
    a unique file identifier; or
    a logical data path.

9. The method according to claim 2, wherein the policy comprises a retention policy comprising:
    applying a restricted state to the portion of the storage medium;
    preventing modification of the restricted state portion of the storage medium; and
    associating a time of expiration with the restricted state portion of the storage medium.

10. The method according to claim 9, wherein said applying a restricted state comprises at least one of:
    triggering initiation of said applying; triggering initiation of said applying upon a occurrence of an event or a state of a data attribute;
    triggering initiation of said applying on a user command;
    triggering initiation of said applying on a file when it is first created;
    triggering initiation of said applying on a file when it is first opened and closed;
    triggering initiation of said applying on a file when a read-only attribute is set;
    setting a restricted state flag associated with a file; or
    setting a read-only attribute associated with a file.

11. The method according to claim 9, wherein preventing modification of the restricted state portion of the storage medium comprises at least one of: preventing renaming, preventing moving, preventing overwriting, preventing overwriting zero length, preventing deleting, preventing at least one form of modification, preventing at least one form of modification of user data, preventing all forms of modification, preventing all forms of modification of user data, or allowing modification of non-user data, of the restricted state portion of the storage medium in the restricted state.

12. The method according to claim 9, wherein the retention policy comprises:
    determining the restricted state portion of the storage medium is in an unexpired restricted state when the associated time of expiration is associated with at least one of: a fixed point in time in the future, an indefinite time of expiration, or an infinite time of expiration; and
    preventing modification of the unexpired restricted state portion of the storage medium.

13. The method according to claim 9, wherein the retention policy comprises: determining the restricted state portion of the storage medium is in an expired restricted state when the associated time of expiration is associated with a fixed time of expiration in the past;
    preventing modification of the expired restricted state portion of the storage medium; and
    allowing deletion of the expired restricted state portion of the storage medium.

14. The method according to claim 9, wherein said associating a time of expiration comprises at least one of:
    assigning said time of expiration by at least one of a user or an external application;
    assigning a fixed point in time for said time of expiration;

assigning a fixed point in time for said time of expiration, wherein the fixed point in time is offset by a period of time;

assigning a fixed point in time in the past for said time of expiration:

assigning a fixed point in time in the future for said time of expiration;

assigning an indefinite time of expiration;

assigning an infinite time of expiration;

preventing assigning a fixed point in time associated with a point in time before an existing associated fixed point in time; and preventing assigning a fixed point in time if the time of expiration is associated with an infinite time of expiration.

15. The method according to claim 9 wherein said retention policy comprises at least one of:

deriving said time of expiration from a last access date and time of the portion of the storage medium wherein the retention policy comprises at least one of:

associating an infinite time of expiration with said last access date and time equaling zero;

associating an indefinite time of expiration with said last access date and time equaling said last modification time;

associating said time of expiration with said last access date and time; or associating said time of expiration with an offset of said last access date and time; or providing said time of expiration from an independent time of the portion of the storage medium wherein the retention policy comprises at least one of:

associating an infinite time of expiration with said independent time equaling 0xFFFFFFFFFFFF or a maximum supported value;

associating an indefinite time of expiration with said independent time equaling 00:00:00 Thursday. Jan, 1, 1970 or 0x0000000000000;

associating said time of expiration with said independent time; or associating said time of expiration with an offset of said independent time.

16. The method according to claim 9, wherein said retention policy further comprises providing for holding a restricted state, wherein said holding comprises at least one of:

suspending expiration of the restricted state portion of the storage medium;

suspending an unexpired restricted state portion of the storage medium from entering an expired restricted state;

suspending the clearing of a read only attribute of the restricted state portion of the storage medium by setting a temporary attribute of the restricted state portion of the storage medium; or suspending deletion of an expired restricted state portion of the storage medium.

17. The method according to claim 9, wherein the retention policy further comprises a secure time routine, the routine comprising at least one of:

using a secure clock;

maintaining a system clock comprising using a secure clock;

verifying operation of a secure clock or authenticating a secure clock;

denying at least one attempted operations if a secure clock can not be at least one of: verified or authenticated; or running a secure clock independent of a server.

18. The method according to claim 1, wherein the allowing or denying said attempted operation further comprises identifying an attribute of data associated with said attempted operation.

19. The method according to claim 1, further comprising creating at least one hash key to validate authenticity of said portion of the storage medium.

20. The method according to claim 19, wherein said creating comprises creating said at least one hash key for all portions of the storage medium.

21. The method according to claim 19, further comprising validating said at least one hash key in regards to said attempted operation.

22. The method according to claim 1, further comprising at least one of: encrypting or decrypting user data.

23. The method according to claim 22, wherein said encrypting or decrypting is independent of a user or an application.

24. The method according to claim 1, further comprising forcing a secure erasure for a delete operation on said at least a portion of the storage medium, wherein secure erasure comprises overwriting the contents of said at least a portion of the storage medium.

25. The method according to claim 1, further comprising obfuscating user data by storing said user data in at least one of: an alternate data stream or an alternate location.

26. The method according to claim 1, further comprising preventing at least one of deinstallation or deletion of at least one of said intercepting, said comparing, or said allowing.

27. The method according to claim 1, wherein said intercepting occurs at a file system layer.

28. The method according to claim 1, further comprising prior to said step of intercepting an attempted operation, associating an application with said at least a portion of the storage medium and determining the application is permitted to attempt operations on said at least a portion of the storage medium.

29. A computer program product for applying an operation access privilege to a storage medium, the computer program product including program logic, which when executed on a computer performs a method, the method comprising:

associating an access privilege with at least a portion of the storage medium;

intercepting an attempted operation on said at least a portion of the storage medium, wherein said intercepting occurs regardless of an identity of a user attempting the attempted operation;

comparing the attempted operation to the access privilege;

allowing, or denying the attempted operation based on comparing the attempted operation to the access privilege; and enforcing at least one retention policy comprising:

applying a restricted state to said at least a portion of the storage medium;

preventing modification of the restricted state portion of the storage medium; and associating a time of expiration with the restricted state portion of the storage medium.

30. The computer program product of claim 29, wherein the retention policy comprises:
- determining the restricted state portion of the storage medium is in an unexpired restricted state when the associated time of expiration is associated with at least one of: a fixed point in time in the future, an indefinite time of expiration, or an infinite time of expiration; and
- preventing modification of the unexpired restricted state portion of the storage medium.

31. The computer program product of claim 29, wherein the retention policy comprises:
- determining the restricted state portion of the storage medium is in an expired restricted state when the associated time of expiration is associated with a fixed time of expiration in the past;
- preventing modification of the expired restricted state portion of the storage medium; and
- allowing deletion of the expired restricted state portion of the storage medium.

32. A system for applying an operation access privilege to a storage medium, comprising:
- means for associating an access privilege with at least a portion of the storage medium;
- means for intercepting an attempted operation on said at least a portion of the storage medium, wherein said intercepting occurs regardless of an identity of a user attempting the attempted operation;
- means for comparing the attempted operation to the access privilege;
- means for allowing, or denying the attempted operation based on comparing the attempted operation to the access privilege; and
- means for enforcing at least one retention policy comprising applying a restricted state to said at least a portion of the storage medium and preventing modification of the restricted state portion of the storage medium.

* * * * *